June 11, 1968  F. R. SADDLER  3,387,821
HYDRAULIC TRAILER JACK
Filed March 28, 1967
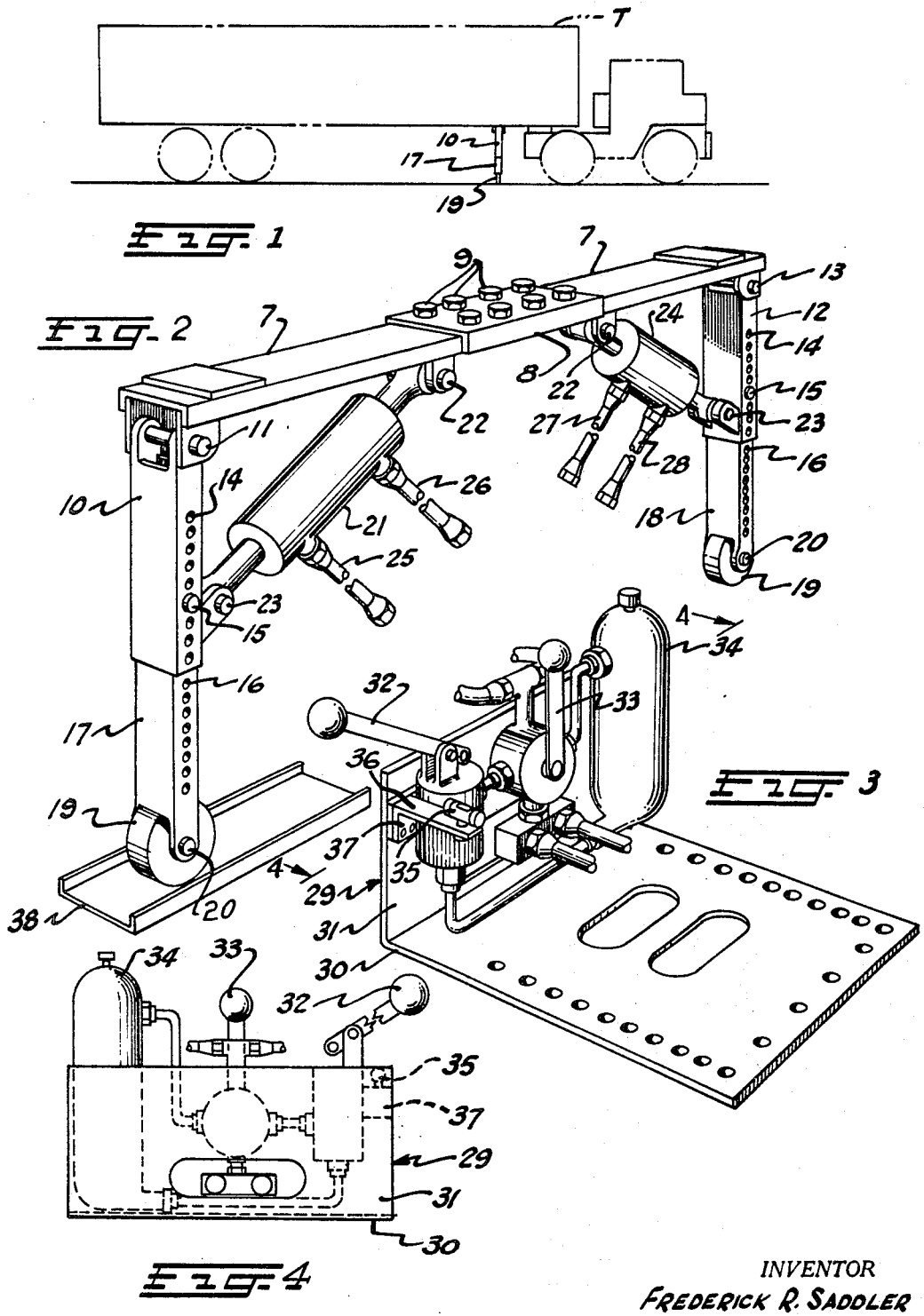
INVENTOR
FREDERICK R. SADDLER

United States Patent Office 3,387,821
Patented June 11, 1968

3,387,821
HYDRAULIC TRAILER JACK
Frederick R. Saddler, 12625 SE. 87th Ave.,
Portland, Oreg. 97266
Filed Mar. 28, 1967, Ser. No. 627,256
5 Claims. (Cl. 254—86)

ABSTRACT OF THE DISCLOSURE

A hydraulic trailer jack including two diametrically opposed vertically adjustable legs that are hingedly mounted on the underside of the forward portion of a trailer; one leg being on each side of the trailer. Each leg has a caster mounted on the lower end thereof. The two legs are hydraulically activated by means of a hydraulic cylinder that has one end connected to a leg and the other end secured to one of the lateral channels that are part of this invention. Hydraulic but manually operated control valves, an oil reservoir, and necessary hydraulic feed lines connected to a source of hydraulic power form part of this invention.

---

The principal object of this invention is to provide a hydraulic trailer jack having independently controlled legs that make it possible to stabilize a parked trailer regardless of the lateral angle of the terrain on which the trailer is resting.

Another object of this invention is to provide a hydraulic trailer jack that, while not only being adjustable laterally to fit any width of trailer, is also adjustable vertically by means of a manually placed locking pin, as will hereinafter be described.

Still another object of this invention is to provide a hydraulic trailer jack having a minimum number of simple configurated parts, thereby reducing both the installation and maintenance time; the maintenance being most important when the trailer is on long hauls away from its maintenance base.

Other and further objects and advantages of this invention will no doubt come to mind as the reading of this specification proceeds and the appended drawing is examined.

In the drawing:

FIG. 1 is a side view of an automotive trailer in phantom lines with this invention in solid black lines secured to the same and in a down or vertical position.

FIG. 2 is a pictorial view of the legs, hydraulic cylinders, and associated mounting of this invention.

FIG. 3 is a pictorial view of the two manually operated control valves, the oil reservoir, associated hydraulic fluid lines, and mounting base and plate.

FIG. 4 is an end view of FIGURE 3, viewed in the direction indicated by the arrowed lines, and number 4 in FIGURE 3.

In the drawing, like parts are indicated by like reference numbers throughout the several views.

Looking first at FIGURE 2 of the drawing, it will be seen that this invention embodies two laterally disposed channels 7 that have their inner end extending into an extension and adjustment channel 8 to which they are secured by means of a plurality of vertically disposed bolts 9. A tubular leg 10 is hingedly secured by the pin 11 to the outer end of one of the aforesaid laterally disposed channels 7, while a like tubular leg 12 is likewise hingedly secured by the pin 13 to the outer end of the other one of the laterally disposed channels 7. Legs 10 and 12 are provided with a plurality of equally spaced openings 14 for the reception of the locking pin 15 that also passes through two diametrically opposed openings 16 in the tubular leg 17 and leg 18 that are slipped into the free that are secured to the legs by means of the supporting pins 20.

Continuing to look at FIGURE 2 of the drawing, it will be seen that a hydraulic cylinder 21 is so located that one end is hingedly secured at 22 to the underside of one of the aforesaid laterally disposed channels 7, while the other end of the same hydraulic cylinder is hingedly secured at 23 to the aforesaid tubular leg 10. A second hydraulic cylinder, which is indicated in the drawing by the reference number 24, is likewise secured to both the other one of the laterally disposed channels 7 and the tubular leg 12. Hydraulic hose 25, 26, 27, and 28 connect the just described leg assembly to that of the hydraulic control assembly 29 which is illustrated in FIGURES 3 and 4 of the drawing by means well understood by those experienced in hydraulic power and control arts.

The aforesaid hydraulic control assembly 29 consists of an L-shaped base plate 30 to the vertical portion 31 of which is secured the hydraulic manually operated pump 32 which provides a means of lowering and raising the aforesaid legs 10 and 12 should the hydraulic power system ever fail. The manually operated hydraulic control valve 33 is also mounted on the aforesaid vertical portion 31 of the base plate 30 as is the oil reservoir 34, all of which are clearly shown in FIGURE 3 and FIGURE 4 of the appended drawing. The aforesaid hydraulic control assembly 29 is mounted at any desired place on the trailer T although this portion of the invention is not shown in FIGURE 1 of the appended drawing for reasons of clarity.

The only part of this invention that has not so far been mentioned is the level 35 that is mounted on the outer end of the L-shaped bracket 36 which has its leg 37 secured to the vertical portion 31 of the L-shaped base plate 30, as is clearly shown in FIGURE 3 of the appended drawing. The purpose of the level 35, which can be rotated 360 degrees, is to assist one in completely leveling the trailer when it is about to be loaded and/or unloaded.

From the foregoing, it will be clearly understood by those experienced in the art, that when this invention is mounted on an automotive trailer, and the device connected to the hydraulic system of the vehicle or to an independent hydraulic system provided just for this purpose, all one has to do to lower the two tubular legs 10 and 12 from a retracted position is to manually move the handle of the control valve 33 in a predetermined direction, thereby causing the hydraulic fluid to flow through the proper hose to the hydraulic cylinders 21 and 24 which will then push the legs 10 and 12 down into a vertical position. The aforesaid control valve 33 can be so manipulated as to permit one to raise or lower two legs either simultaneously or separately according to the needs of the operator of the mechanism. Moving the handle of the control valve 33 in the opposite direction will cause the legs 10 and 12 to retract up under the body of the end of the legs 10 and 12. The lower ends of the tubular legs 17 and 18 are each cut out to receive the casters 19 trailer T. A channel 38 is normally placed under the casters 19 when the legs 10 and 12 are lowered in order to prevent the weight of the trailer from pressing the casters down into the ground if the ground is not hard.

This invention of mine is subject to any changes or modifications one may care to make in so long as the changes and modifications fall within the scope and intent of the appended claims.

What I now claim as new is:

1. A hydraulically actuated trailer jack mechanism of the character described, comprising a pair of opposed spaced apart adjustable length legs, laterally adjustable support means to be connected to said trailer for supporting said legs, means mounting one end of each leg on the remote ends of said support means for swinging movement toward and away from each other between a generally horizontal collapsed position to a generally vertical lifting position, means on the other end of each leg for engaging a support surface, means for selectively securing each leg at a predetermined length, and hydraulic means for selectively moving each of said legs from said collapsed position to said vertical lifting position to thereby raise said trailer.

2. The jack mechanism of claim 1, wherein each leg comprises upper and lower telescoping tubular members, said members being provided with mating apertures for receiving locking pins.

3. The jack mechanism of claim 1, wherein said support surface engaging means on said legs are casters.

4. The jack mechanism of claim 1, wherein said hydraulic means are double-acting piston and cylinder means and means pivotally connecting said piston and cylinder means to said support and said legs.

5. The jack mechanism of claim 4, wherein said hydraulic means includes control means for selectively actuating said piston and cylinder means.

References Cited

UNITED STATES PATENTS 1,875,636  9/1932  Miller _____ 254—86
2,870,851  1/1959  Clark.

OTHELL M. SIMPSON, *Primary Examiner.*